United States Patent
Urata et al.

(10) Patent No.: US 10,829,405 B2
(45) Date of Patent: Nov. 10, 2020

(54) METHOD FOR PRODUCING POROUS GLASS DEPOSIT FOR OPTICAL FIBER

(71) Applicant: SHIN-ETSU CHEMICAL CO., LTD., Tokyo (JP)

(72) Inventors: Yuhei Urata, Ibaraki (JP); Hiroki Kojima, Ibaraki (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 143 days.

(21) Appl. No.: 16/149,634

(22) Filed: Oct. 2, 2018

(65) Prior Publication Data

US 2019/0106351 A1 Apr. 11, 2019

(30) Foreign Application Priority Data

Oct. 5, 2017 (JP) .................................. 2017-195351

(51) Int. Cl.
*C03B 37/014* (2006.01)

(52) U.S. Cl.
CPC ........ *C03B 37/014* (2013.01); *C03B 37/0142* (2013.01); *C03B 2207/06* (2013.01);
(Continued)

(58) Field of Classification Search
CPC .............. C03B 37/014; C03B 37/0142; C03B 2207/20; C03B 2207/24; C03B 2207/06;
(Continued)

(56) References Cited

U.S. PATENT DOCUMENTS 5,599,371 A 2/1997 Cain et al.
2005/0274150 A1* 12/2005 Onodera ............. C03B 37/0142
65/421

(Continued)

FOREIGN PATENT DOCUMENTS

JP H02-22137 1/1990
JP H10-330129 A 12/1998

(Continued)

OTHER PUBLICATIONS

India Office Action, India patent Office, Application No. 201814036147, dated Feb. 20, 2020.

(Continued)

*Primary Examiner* — Queenie S Dehghan
(74) *Attorney, Agent, or Firm* — Greenblum & Bernstein, P.L.C.

(57) ABSTRACT

A method is provided for producing a glass fine particle deposit by a VAD method using a core deposition burner and a cladding deposition burner disposed adjacent to the core deposition burner. The cladding deposition burner including five cylindrical tubes having different outer diameters and concentrically superimposed on one another and a group of small-diameter nozzles arranged in a ring shape in a third region from the inner side. The method includes flowing, in the cladding deposition burner, a glass raw material gas and a combustion supporting gas in a first region from the inner side, air in a second region from the inner side, a combustible gas in the third region from the inner side, a combustion supporting gas in the group of small-diameter nozzles, an inert gas in a fourth region from the inner side, and a combustion supporting gas in a fifth region from the inner side, respectively.

8 Claims, 2 Drawing Sheets

(52) U.S. Cl.
CPC ...... *C03B 2207/20* (2013.01); *C03B 2207/22* (2013.01); *C03B 2207/24* (2013.01); *C03B 2207/36* (2013.01); *C03B 2207/50* (2013.01)

(58) Field of Classification Search
CPC ............ C03B 2207/22; C03B 2207/36; C03B 2207/50
See application file for complete search history.

(56) References Cited

U.S. PATENT DOCUMENTS

| | | |
|---|---|---|
| 2009/0214998 A1 | 8/2009 | Yoshida et al. |
| 2013/0091900 A1* | 4/2013 | Yoshida .............. C03B 37/0142 65/421 |
| 2014/0174135 A1 | 6/2014 | Urata |
| 2018/0044221 A1* | 2/2018 | Kojima ............. C03B 37/01413 |

FOREIGN PATENT DOCUMENTS

| | | |
|---|---|---|
| JP | 2003-226544 A | 8/2003 |
| JP | 2009-227569 | 10/2009 |
| JP | 2013-014467 | 1/2013 |
| JP | 2014-122141 A | 7/2014 |

OTHER PUBLICATIONS

Japanese Office Action, Japanese Patent Office, Application No. 2017-195351, dated Jun. 2, 2020, with English translation thereof.

\* cited by examiner

METHOD FOR PRODUCING POROUS GLASS DEPOSIT FOR OPTICAL FIBER

CROSS-REFERENCE TO RELATED APPLICATION

This non-provisional application claims priority under 35 U.S.C. § 119(a) from Japanese Patent Application No. 2017-193351, filed on Oct. 5, 2017, the entire contents of which are incorporated herein by reference.

BACKGROUND

Technical Field

The present invention relates to a method for producing an optical fiber preform with less melt residue.

Background Art

Similarly to the relationship between a core and a cladding of the optical fiber, the optical fiber preform has difference in refractive index between a core portion and a cladding portion, and has a refractive index distribution shape in the core portion.

In a VAD method, which is one type of a method for producing an optical fiber preform, the optical fiber preform is sometimes produced by simultaneously using a core deposition burner for depositing a core and a cladding deposition burner for depositing a cladding disposed on the outside of the core deposition burner. In such a production method, in addition to the basic function of depositing a cladding, functions such as burning of the core, adjustment of the refractive index distribution of the core, and densification of a glass fine particle deposit are sometimes imparted to the cladding deposition burner.

Due to the increase in worldwide demand for optical fibers, a more productive production process is required, and the same applies to the VAD method. In order to increase the deposition efficiency of the cladding deposition burner, a burner including a group of small-diameter nozzles concentrically arranged as disclosed in JP 2009-227569 A has been proposed. In JP 2009-227569 A, a multi-nozzle burner in which a raw material gas ejecting channel is disposed at the center of a multi-layer circular tube composed of a plurality of cylinders, and an auxiliary combustion supporting gas ejecting channel is provided in a ring shape in a combustible gas channel so as to surround this raw material gas ejecting channel as shown in FIG. 1.

A burner 10 shown in FIG. 1 includes a nozzle 11a for ejecting a glass raw material gas and a combustion supporting gas, a small-diameter nozzle group 11c for ejecting an auxiliary combustion supporting gas, and a nozzle 11d for ejecting a hydrogen gas. In addition to these, the burner 10 includes nozzles 11b and 11e for ejecting an inert gas as a sealing gas, and a nozzle 11f for ejecting a combustion supporting gas. This burner 10 obtains an effect of increasing a linearity of a burner flame by providing a group of small-diameter nozzles arranged concentrically in a region in which a combustible gas flows so as to flow a combustion supporting gas also in the region in which the combustible gas flows in addition to a region in which a combustion supporting gas flows.

SUMMARY OF THE INVENTION

Problems to be Solved by the Invention

However, if the flow rate of the combustible gas is simply increased in the burner described in JP 2009-227569 A to adjust the refractive index distribution shape of the core portion, a region having a high density of the glass fine particles locally is formed, and as a result, there is a problem that melt residue occurs when sintering and transparentizing a glass fine particle deposit.

Means for Solving the Problems

A method for producing a glass fine particle deposit according to the present invention is conceived to solve the problem described above, and is a method for producing a glass fine particle deposit by a VAD method using a core deposition burner and a cladding deposition burner. The cladding deposition burner includes five cylindrical tubes having different outer diameters and concentrically superimposed on one another and a group of small-diameter nozzles arranged in a ring shape in a third region from the inner side, and is disposed adjacent to the core deposition burner. The method includes flowing, in the cladding deposition burner, a glass raw material gas and a combustion supporting gas in a first region from the inner side, air in a second region from the inner side, a combustible gas in the third region from the inner side, a combustion supporting gas in the group of small-diameter nozzles, an inert gas in a fourth region from the inner side, and a combustion supporting gas in a fifth region from the inner side, respectively. In the flowing, a ratio obtained by dividing a linear velocity of the combustion supporting gas flowing in the group of small-diameter nozzles by a linear velocity of the combustible gas flowing in the third region is from 2.2 to 4.3.

The method for producing a glass fine particle deposit according to the present invention may be a method for producing a glass fine particle deposit by a VAD method using a core deposition burner and a cladding deposition burner. The cladding deposition burner includes five cylindrical tubes having different outer diameters and concentrically superimposed on one another and a group of small-diameter nozzles arranged in a ring shape in a third region from the inner side. The method includes flowing, in the cladding deposition burner, a glass raw material gas and a combustion supporting gas in a first region from the inner side, air in a second region from the inner side, a combustible gas in the third region from the inner side, a combustion supporting gas in the group of small-diameter nozzles, an inert gas in a fourth region from the inner side, and a combustion supporting gas in a fifth region from the inner side, respectively. In the flowing, a ratio obtained by dividing a linear velocity of the combustion supporting gas flowing in the group of small-diameter nozzles by a linear velocity of the combustible gas flowing in the third region is from 2.2 to 4.3. The cladding deposition burner deposits a cladding portion on a core portion deposited by the core deposition burner while heating the core portion.

In the method for producing a glass fine particle deposit according to the present invention, it is preferable to use oxygen as the combustion supporting gas flowing in the group of small-diameter nozzles. Also, it is preferable to use hydrogen as the combustible gas flowing in the third region.

DETAILED DESCRIPTION OF THE EMBODIMENTS

Figure 2:
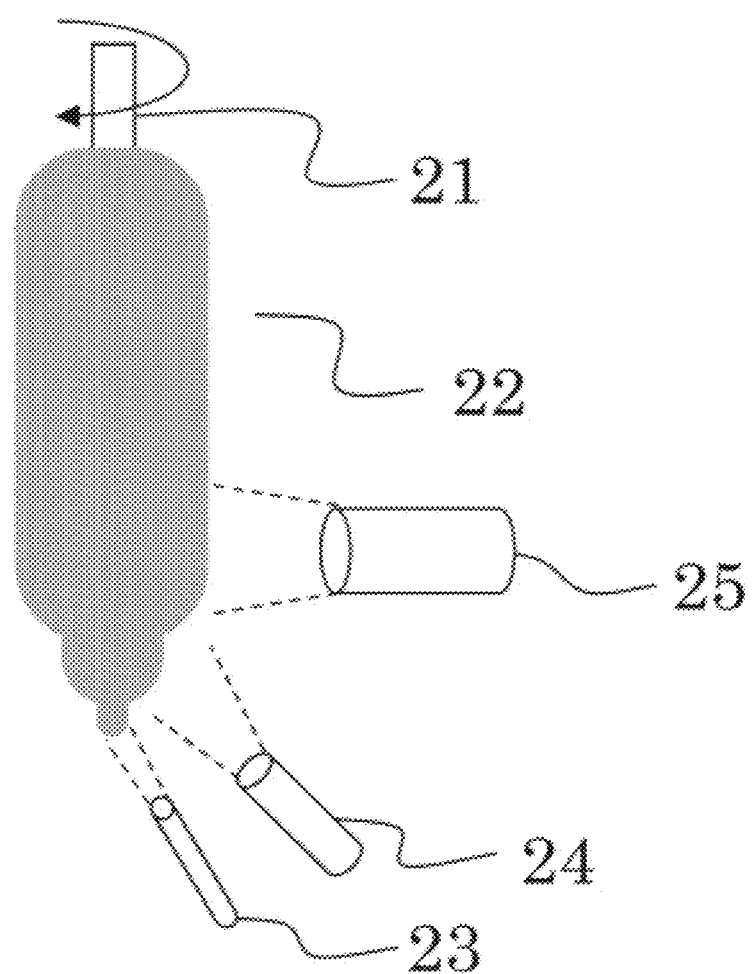
FIG. 2 is a schematic diagram showing a state during production of a glass fine particle deposit by the VAD method.

An embodiment of the present invention will be described below with reference to the drawings. FIG. 2 schematically shows a state during the production of the glass fine particle deposit by the VAD method. A core portion deposition burner 23 illustrated at the lowermost part is independent of cladding portion deposition burners 24 and 25 in order to use a dopant material such as germanium tetrachloride in addition to silicon tetrachloride, and, as a whole, a plurality of burners are disposed to produce soot.

In this production method, the core portion located at the center is deposited on a starting material by using the core portion deposition burner 23. Thereafter, the cladding portion is formed so as to cover the core portion from the outside by the cladding portion deposition burners 24 and 25. That is, the cladding portion deposition burner 24 deposits a cladding portion on the core portion while heating the core portion deposited by the core portion deposition burner 23.

The cladding portion deposition burner 24 depicted on the right side of the core portion deposition burner 23 in FIG. 2 also has a role other than depositing the cladding. For example, the core portion is burned with a flame to increase the density to prevent cracking. In addition, the diameter of the core is reduced by burning the core to prevent redeposition of undeposited germanium oxide. Furthermore, the temperature of the core portion is increased by flame to vaporize excessive germanium oxide.

Example 1

As Example 1 of the present invention, a glass fine particle deposit was produced by using three burners in total. The three burners include the core portion deposition burner 23, a first cladding portion deposition burner 24, and a second cladding portion deposition burner 25. As shown in FIG. 2, the burner 10 of FIG. 1 was used as the first cladding portion deposition burner 24, and the first cladding portion deposition burner 24 is disposed adjacent to the core portion deposition burner 23. Conditions for producing the glass fine particle deposit were as follows.

That is, in the nozzle 11a of the first cladding portion deposition burner 24, silicon tetrachloride is flowed at a flow rate of 0.88 L/min., and oxygen is flowed at a flow rate of 0.74 L/min. Air is flowed in the nozzle 11b at a flow rate of 1.0 L/min. Hydrogen is flowed in the nozzle 11d at a flow rate of 30.0 L/min. Nitrogen is flowed in the nozzle 11e at a flow rate of 4.0 L/min. Oxygen is flowed in the nozzle 11f at a flow rate of 15.0 L/min. Oxygen is flowed in the small-diameter nozzle group 11c at a total flow rate of 2.80 L/min. For each gas species, the flow rate of the gas indicates the flow rate in the standard state (0° C., 1 atm) (the same applies to the rest of this specification).

Meanwhile, in the core portion deposition burner 23, oxygen is flowed at a flow rate of 9.0 L/min., hydrogen is flowed at a flow rate of 6.4 L/min., argon is flowed at a flow rate of 0.4 L/min., silicon tetrachloride is flowed at a flow rate of 0.45 L/min., and germanium tetrachloride is flowed at a flow rate of 15 cc/min.

When the production is performed under the above conditions, a ratio $U_O/U_H$ obtained by dividing a linear velocity $U_O$ of oxygen in the small-diameter nozzle group 11c by a linear velocity $U_H$ of hydrogen in the first cladding portion deposition burner 24 is 2.91. The linear velocity is a value obtained by dividing the flow rate of each gas in the standard state by the cross-sectional area of the nozzle (the same applies to the rest of this specification).

A transparent glass rod without a melt residue defect was successfully produced by heating the glass fine particle deposit produced under the above conditions to around 1500° C. in a furnace tube to sinter and transparentize the glass fine particle deposit. The overall silicon dioxide deposition efficiency was 60.4%.

Example 2

As Example 2 of the present invention, production was performed by changing the burner gas condition of Example 1.

That is, in the nozzle 11a of the first cladding portion deposition burner 24, silicon tetrachloride is flowed at a flow rate of 0.9 L/min., and oxygen is flowed at a flow rate of 0.8 L/min. Hydrogen is flowed in the nozzle 11d at a flow rate of 26.9 L/min. Oxygen is flowed in the nozzle 11f at a flow rate of 13 L/min. Oxygen is flowed in the small-diameter nozzle group 11c at a total flow rate of 3.9 L/min. The other gas conditions are the same as in Example 1.

When the production is performed under the above conditions, the ratio $U_O/U_H$ obtained by dividing a linear velocity $U_O$ of oxygen in the small-diameter nozzle group 11c by a linear velocity $U_H$ of hydrogen in the first cladding portion deposition burner 24 is 4.22.

A transparent glass rod without a melt residue defect was successfully produced by heating the glass fine particle deposit produced under these conditions to around 1500° C. in a furnace tube to sinter and transparentize the glass fine particle deposit. The overall silicon dioxide deposition efficiency was 60.2%.

Conventional Example

Figure 1:
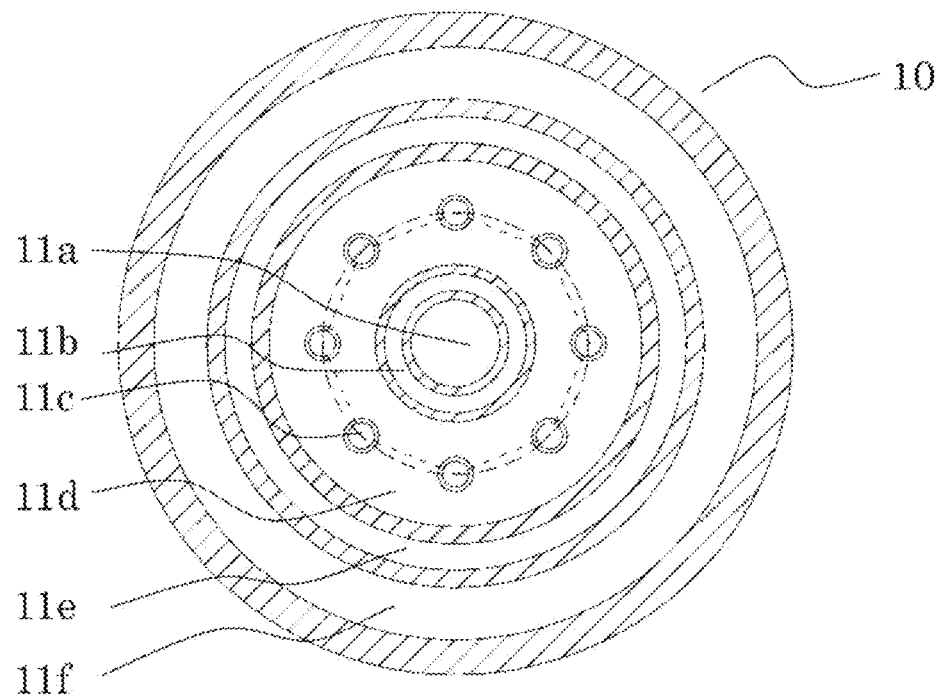
FIG. 1 is a diagram showing a sectional structure of a first cladding deposition burner for describing an embodiment of the present invention.

As a conventional example, production was performed by using a quadruple tube burner including a plurality of cylindrical glass tubes having different diameters and concentrically superimposed on one another as the first cladding portion deposition burner 24 of Example 1 instead of the burner 10 having the shape of FIG. 1. Conditions for producing the glass fine particle deposit were as follows. That is, oxygen is flowed at a flow rate of 18.5 L/min., hydrogen is flowed at a flow rate of 22.6 L/min., argon is flowed at a flow rate of 1.5 L/min., and silicon tetrachloride is flowed at a flow rate of 0.85 L/min.

When a transparent glass rod was produced by heating the glass fine particle deposit produced under these conditions to around 1500° C. in a furnace tube to sinter and transparentize the glass fine particle deposit, no melt residue defect occurred. The overall silicon dioxide deposition efficiency was 55.8%.

Reference Example

As Reference Example, production was performed by changing the burner gas condition of Example 1 to the following condition. That is, in the nozzle 11a of the first cladding portion deposition burner 24, silicon tetrachloride is flowed at a flow rate of 0.9 L/min., and oxygen is flowed at a flow rate of 0.8 L/min. Hydrogen is flowed in the nozzle 11d at a flow rate of 26.9 L/min. Oxygen is flowed in the nozzle 11f at a flow rate of 13 L/min. Oxygen is flowed in the small-diameter nozzle group 11c at a total flow rate of 4.8 L/min. The other gas conditions are the same as in Example 1.

When the production is performed under the above conditions, a ratio $U_O/U_H$ obtained by dividing a linear velocity $U_O$ of oxygen in the small-diameter nozzle group by a linear velocity $U_H$ of hydrogen in the first cladding portion deposition burner is 5.01.

The glass fine particle deposit produced under these conditions was heated to around 1500° C. in a furnace tube to sinter and transparentize the glass fine particle deposit, a melt residue defect near the core occurred all over the glass rod in the longitudinal direction, and the glass rod was unusable as a product. The overall deposition efficiency was 60.1%.

The deposition efficiency and the weight of melt residue defect in each condition are summarized in Table 1.

TABLE 1

| Linear velocity ratio $U_o/U_H$ | Deposition efficiency (%) | Weight of melt residue defect (g) |
|---|---|---|
| 2.22 | 54.9 | 925 |
| 2.29 | 54.7 | 0 |
| 2.36 | 55.3 | 0 |
| 2.40 | 54.4 | 922 |
| 2.91 | 60.4 | 0 |
| 3.89 | 61.2 | 0 |
| 4.22 | 61.7 | 0 |
| 4.54 | 61.5 | 1927 |
| 4.69 | 60.0 | Whole area |
| 5.01 | 60.1 | Whole area |
| Quadruple tube burner | 55.8 | 0 |

As described above, in the method for producing a glass fine particle deposit for optical fiber according to the present invention, a quintuple tube burner including a group of small-diameter nozzles arranged in a ring shape in a gas ejecting port that is the third from the inner side is employed as a cladding deposition burner adjacent to a core deposition burner in the VAD method, and the ratio $U_C/U_H$ of the linear velocity $U_C$ of a combustion supporting gas ejected from the group of small-diameter nozzles to the linear velocity $U_H$ of a combustible gas ejected from the gas ejecting port that is the third from the inner side is set to 2.2 to 4.3.

According to the present invention, by setting the gas conditions such that the ratio $U_O/U_H$ of the linear velocity $U_O$ of a combustion supporting gas ejected from the group of small-diameter nozzles to the linear velocity $U_H$ of a combustible gas ejected from the gas ejecting port that is the third from the inner side of the cladding deposition burner adjacent to the core deposition burner is from 2.2 to 4.3, a glass fine particle deposit for optical fiber with less melt residue after the sintering and transparentizing can be produced while adjusting the shape of refractive index distribution with a high deposition efficiency.

What is claimed is:

1. A method for producing a glass fine particle deposit by a VAD method using a core deposition burner and a cladding deposition burner, the cladding deposition burner including five cylindrical tubes having different outer diameters and concentrically superimposed on one another and a group of small-diameter nozzles arranged in a ring shape in a third region from an inner side, and being disposed adjacent to the core deposition burner, the method comprising:

flowing, in the cladding deposition burner, a glass raw material gas and a combustion supporting gas in a first region from the inner side, air in a second region from the inner side, a combustible gas in the third region from the inner side, a combustion supporting gas in the group of small-diameter nozzles, an inert gas in a fourth region from the inner side, and a combustion supporting gas in a fifth region from the inner side, respectively, wherein, in the flowing, a ratio obtained by dividing a linear velocity of the combustion supporting gas flowing in the group of small-diameter nozzles by a linear velocity of the combustible gas flowing in the third region is from 2.2 to 4.3.

2. The method for producing a glass fine particle deposit according to claim 1, wherein the combustion supporting gas flowing in the group of small-diameter nozzles is oxygen.

3. The method for producing a glass fine particle deposit according to claim 2, wherein the combustible gas flowing in the third region is hydrogen.

4. The method for producing a glass fine particle deposit according to claim 1, wherein the combustible gas flowing in the third region is hydrogen.

5. A method for producing a glass fine particle deposit by a VAD method using a core deposition burner and a cladding deposition burner, the cladding deposition burner including five cylindrical tubes having different outer diameters and concentrically superimposed on one another and a group of small-diameter nozzles arranged in a ring shape in a third region from an inner side, the method comprising:

flowing, in the cladding deposition burner, a glass raw material gas and a combustion supporting gas in a first region from the inner side, air in a second region from the inner side, a combustible gas in the third region from the inner side, a combustion supporting gas in the group of small-diameter nozzles, an inert gas in a fourth region from the inner side, and a combustion supporting gas in a fifth region from the inner side, respectively, wherein, in the flowing, a ratio obtained by dividing a linear velocity of the combustion supporting gas flowing in the group of small-diameter nozzles by a linear velocity of the combustible gas flowing in the third region is from 2.2 to 4.3, and the cladding deposition burner deposits a cladding portion on a core portion deposited by the core deposition burner while heating the core portion.

6. The method for producing a glass fine particle deposit according to claim 5, wherein the combustion supporting gas flowing in the group of small-diameter nozzles is oxygen.

7. The method for producing a glass fine particle deposit according to claim 6, wherein the combustible gas flowing in the third region is hydrogen.

8. The method for producing a glass fine particle deposit according to claim 5, wherein the combustible gas flowing in the third region is hydrogen.

* * * * *